Figure 1:
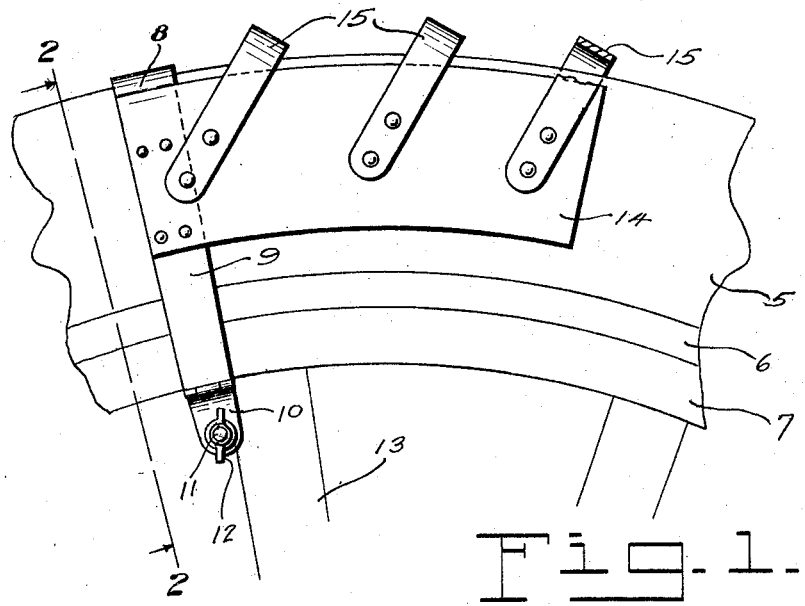

P. W. DEUEL.
TRACTION DEVICE.
APPLICATION FILED JULY 7, 1920.

1,391,721.

Patented Sept. 27, 1921.

INVENTOR:
Pliny W. Deuel.

ATTORNEYS.

UNITED STATES PATENT OFFICE.

PLINY W. DEUEL, OF CHICAGO, ILLINOIS.

TRACTION DEVICE.

1,391,721.  Specification of Letters Patent.  Patented Sept. 27, 1921.

Application filed July 7, 1920. Serial No. 394,415.

*To all whom it may concern:*

Be it known that I, PLINY W. DEUEL, a citizen of the United States, residing at Chicago, in the county of Cook and State of Illinois, have invented new and useful Improvements in Traction Devices, of which the following is a specification.

This invention relates to devices applicable to the tires of motor vehicle and other wheels and designed to obtain traction on muddy and sandy roads.

The invention has for its object to provide a very simple and efficient device of the character stated, and also one which can be easily attached and removed.

With the object stated in view, the invention consists in a novel combination and arrangement of parts to be hereinafter described and claimed, and in order that the same may be better understood, reference is had to the accompanying drawing forming a part of this specification.

Figure 2:
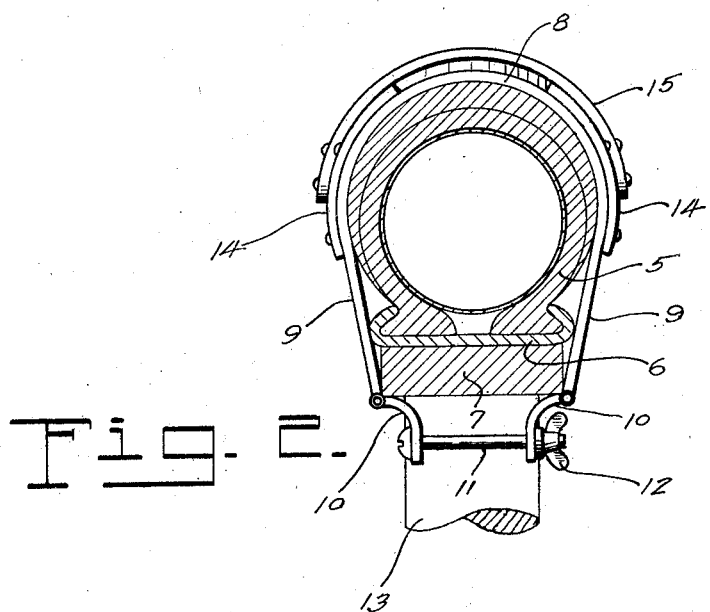

In the drawing,

Figure 1 is a side elevation of a fragment of a wheel showing the application of the device with the latter partly in section, and Fig. 2 is a cross-section on the line 2—2 of Fig. 1.

Referring specifically to the drawing, 5 denotes an ordinary pneumatic tire carried by a rim 6 on the felly 7 of the wheel.

The attaching member of the antislipping device is a yoke 8 which is positioned to straddle the tire 5 transversely, the branches 9 of the yoke seating alongside the tire and extending inwardly far enough to come alongside the felly 7. The inner ends of the yoke branches carry hinged leaves 10 connected by a clamping bolt 11 extending transversely beneath the felly 7. When the nut 12 of the bolt 11 is tightened up, the yoke branches are drawn together against the felly sides, and the yoke is securely held in place. As shown in Fig. 1, the yoke can be placed so that the parts 10 are contiguous to one of the spokes 13 of the wheel, to resist the tendency of the yoke slipping along the tire due to the tractive effort of the devices carried by the yoke.

The yoke branches 9 carry laterally projecting plates 14 positioned alongside the tire 5 and extending in a circumferential direction. These side plates are riveted or otherwise rigidly fastened to the yoke branches, and they carry the anti-slipping device, the latter being arched members 15 having their ends firmly riveted or otherwise secured to the side plates and positioned to straddle the tire transversely. The members 15 are not set radially, but they are inclined so as to extend across the tire obliquely as clearly shown in Fig. 1.

Where the members 15 arch across the tire tread, their oblique position on the tire gives them the shape of a scoop the inside of which extends at an oblique angle to and faces in the direction the wheel travels, thereby obtaining a maximum traction effect. This result is obtained by a very simple and inexpensive means, the arched means being plain metal strips.

The members 15 are close to the surface of the tire, but not in contact therewith, and hence they cannot cut or injure the tire when the latter is properly inflated.

I claim:

An anti-slipping device for vehicle tires, comprising plates seating along the sides of the tire, a plurality of arched traction strips connecting said plates and straddling the tread of the tire transversely at an oblique angle to and facing in the direction the wheel travels, said strips being spaced intermediate their ends from the tread of the tire, and attaching means for the aforesaid side plates.

In testimony whereof I affix my signature.

PLINY W. DEUEL.